March 29, 1966 E. W. J. CADDY ET AL 3,243,187

RECORD CHANGING MECHANISM

Filed Dec. 18, 1961 3 Sheets-Sheet 1

RECORD CHANGING MECHANISM

March 29, 1966 E. W. J. CADDY ETAL 3,243,187

RECORD CHANGING MECHANISM

Filed Dec. 18, 1961 3 Sheets-Sheet 3

United States Patent Office 3,243,187
Patented Mar. 29, 1966

3,243,187

RECORD CHANGING MECHANISM

Edward William John Caddy, Swindon, and Iris Dulcie Guest, Shrewsbury, England, and Lawrence Vincent Guest, deceased, late of Shrewsbury, England, by Francis Gregory Guest, administrator, Shrewsbury, England, assignors to The Garrard Engineering and Manufacturing Company Limited, Swindon, Wiltshire, England Filed Dec. 18, 1961, Ser. No. 160,360
Claims priority, application Great Britain, Dec. 20, 1960, 43,702/60
5 Claims. (Cl. 274—10)

This invention relates to a record changing mechanism for incorporation into an automatic record changing phonograph, and it is an object of the present invention to provide an improved mechanism in which the number of members necessary to provide various functions is reduced.

The present invention consists in a record changing mechanism which includes a control member arranged to provide a mechanical linkage between a manually operable control lever, a switch lever, and a transfer lever associated with an overarm used for steadying records on a central stack, which control member is arranged to be moved longitudinally by means of an operating member which may also be employed to operate a record size selector mechanism, the control member being locatable in a number of different angular and linear positions, combinations of which are utilized to provide the conventional functions of such a mechanism.

In one form, the control member has four linear positions and four angular positions, and four different combinations of these positions are employed so that:

(i) The mechanism may be operated manually or will cycle in conventional manner between the playing of records.

(ii) The last record when dropped from the stack will be detected and played without switching off, and (iii) The motor will be switched off and the mechanism re-set for the next cycle when the last record has been played and the pick-up arm has been returned to the rest position.

Figures 1, 2:
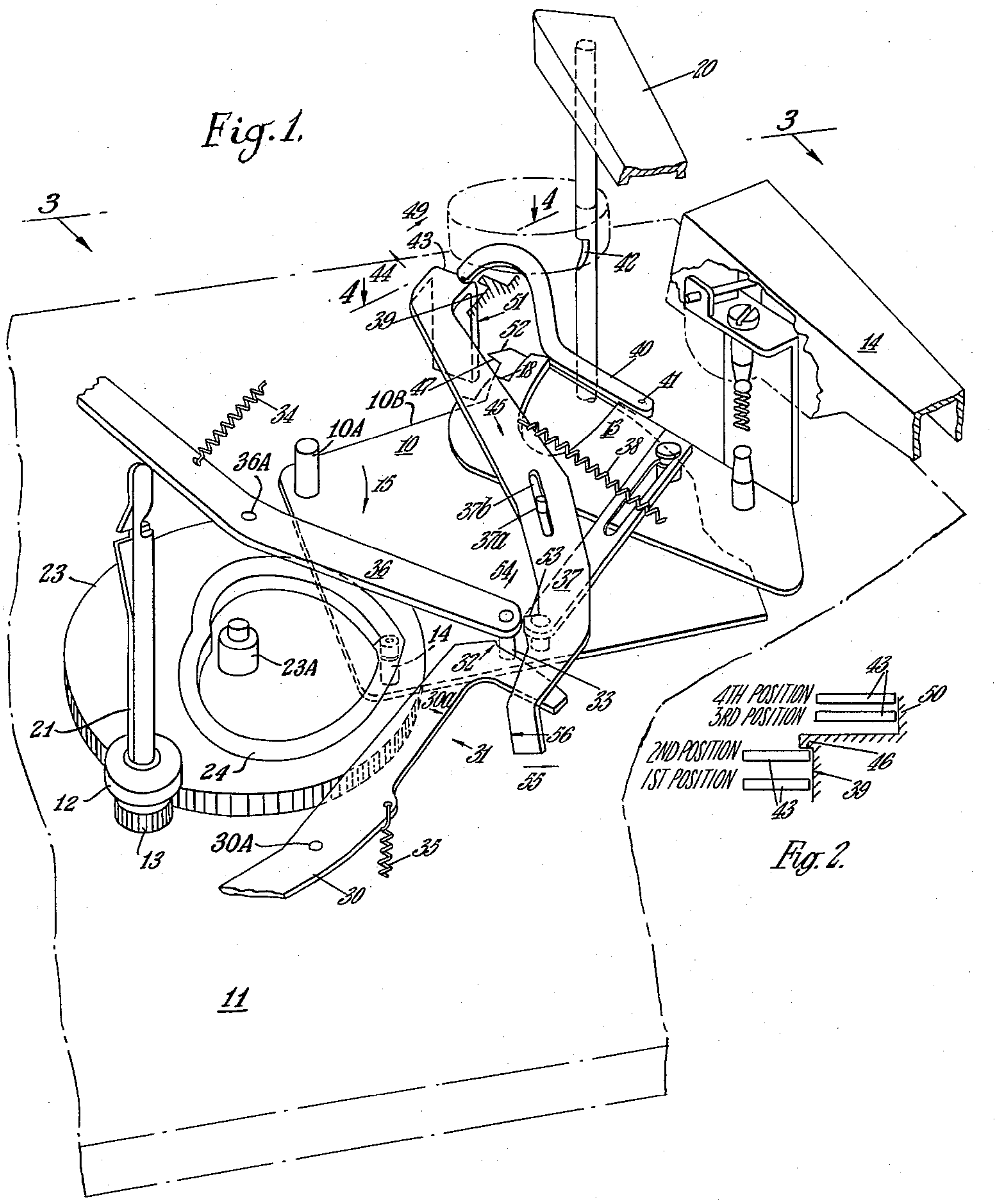
FIGURE 1 shows diagrammatically a record changing mechanism according to the present invention, with portions removed for clarity.
FIGURE 2 shows diagrammatically the mode of operation of a portion of FIGURE 1.

In carrying the invention into effect according to one convenient mode by way of example, FIGURE 1 shows diagrammatically a record changing mechanism from which portions have been removed for clarity.

The record changing and cycling mechanism of the instant invention is mounted on the usual base plate 11 which rotatably supports a turntable 12 which is driven, usually by means of a rim drive, from a motor (not shown). A spindle 21 is provided for supporting and dropping the records in automatic sequence. The record dropping mechanism forms no part of the instant invention. A change cam 23 pivotally mounted on the base plate as at 23A, is provided with a cam groove 24 for operating the mechanism to be hereafter described. The turntable carries a pinion 13 adapted to cyclically rotate change cam 23 by any suitable means. One such means for initiating the cyclical operation of change cam 23 is shown in U.S. Patent 2,640,705, issued to E. W. Mortimer on June 2, 1953.

The sequence of operation will now be described, starting with the mechanism in the final switched-off position, with a stack of records loaded onto the central spindle, and with the overarm 20 positioned on top of the record stack.

Figures 3, 4, 5:
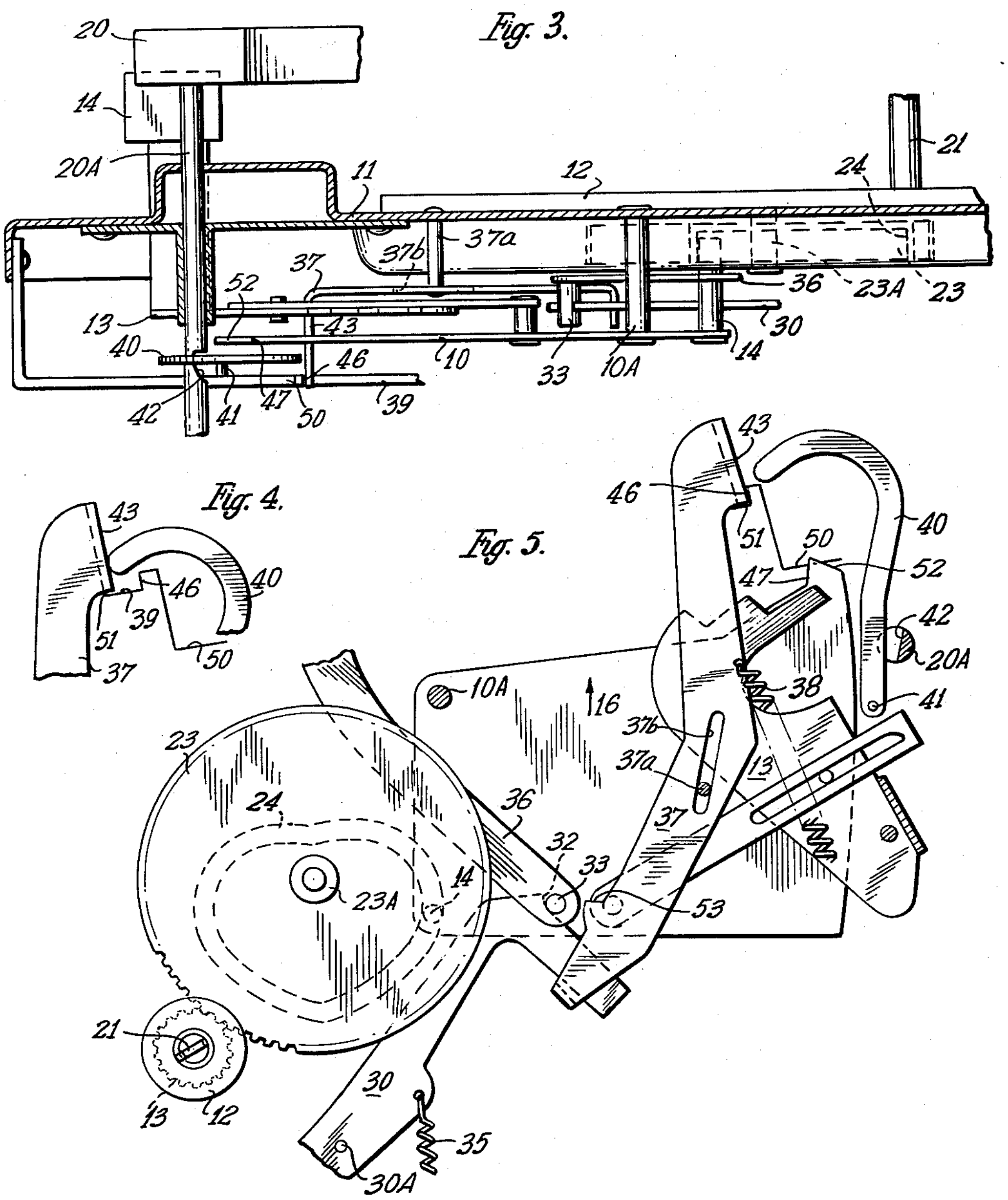
FIGURE 3 is a partial sectional elevational view looking in the direction of the arrows 3—3 of FIG. 1.
FIGURE 4 is a plan view, looking in the direction of arrows 4—4 of FIG. 1, of a portion of the mechanism in the first position.
FIGURE 5 is a partial plan view of the mechanism in the second position.

Firstly, the control lever 30, which is pivoted to base plate 11 at 30A, is pivoted in the direction of arrow 31 until the notch 32 is engaged behind the pin 33 as shown in FIG. 5. This pin 33 is carried at the end of a switch operating lever 36 which is pivoted to the base plate as at 36A and which is spring-loaded by means of spring 34 also connected to the base plate. The broken away end of switch operating lever 36 contacts the on-off switch (not shown) which controls the electric circuit to the turntable driving motor. The broken off end of control lever 30 is adapted for manual operation. Thus the control lever 30 is held in the position shown on the drawing by the pin 33 and its spring pressure against the notch 32. The control lever 30 is also spring-loaded by spring 35 connected to the base plate, which exerts sufficient force to return lever 30 to its original position when pin 33 is moved to release the notch 32. The original position is the "off" position while the position with pin 33 engaged in notch 32 is the "on" position.

As stated, the switch operating lever 36 is connected to a switch at its far end which controls the turntable motor and in the position shown in the drawing the switch is operated to the "on" position. If the record changer is being switched to a position for manual operation, then the movement of the control lever 30 will be only far enough for the pin 33 to engage behind the notch 32 as best shown in FIG. 5.

Further movement of the control lever 30 in the direction of arrow 31, which is necessary for the initiation of automatic operation, causes the lever 30 to engage the auto-trip mechanism (not shown) which in turn engages the teeth on the cam with the gear on the turntable in conventional manner, thereby starting a record changing cycle.

In order to understand the movement of the control member which comprises a lever 37, which is of fundamental importance in this mechanism, reference must be made to the action of the overarm lever 40 pivoted at 41 to the base plate. When the overarm 20, which is rotatably and slideably mounted in the base plate on an overarm shaft 20A, is fully down, i.e. no records are stacked on the central spindle of the turntable, a notch 42 in its shaft allows the lever 40 to move away from the end face 43 of lever 37 into notch 42 (FIGS. 3 and 6–8), but when the overarm 20 is raised to rest on a stack of records on the central spindle, the lever 40 is moved to engage face 43 on lever 37 thereby holding this lever 37 in a certain angular position (FIG. 4). It should be noted that the lever 37, which is mounted for angular and linear movement by means of pin 37*a* secured to the base plate and extending through slot 37*b*, is held by plate 10 in an outward linear position against the tension of a spring 38 connected to the base plate as shown by arrow 44 at the rest position and at commencement of a record changing cycle. At the rest position, a cam plate 10, which is pivoted to the base plate by means of a pivot 10A and which is oscillated by means of change cam 23 by cooperation between a follower 14 on the cam plate and cam groove 24, is rotated to the limit of its oscillating movement in a direction opposite to the direction of arrow 15. The outward linear position is accomplished by engagement of an edge 10B of cam plate 10 with an edge 51 of lever 37. When the cam plate 10 commences to move in the direction of arrow 15 upon rotation of the change cam during a record changing cycle, the lever 37 is freed and the tension spring 38 is permitted to slide lever 37 in the direction of arrow 45 until the edge 51 of the face 43 of the lever 37 contacts a face 39, the lever 37 then being in a first position. Face 39 is part of a cam plate secured to and forming part of the base plate to thereby define the limits of certain angular positions of lever 37. The first position is best shown in FIG. 4 with this position occurring throughout record play when records are mounted on spindle 21 and overarm 20 is thereby supported to maintain notch 42 above and out of alignment with overarm lever 40. This causes overarm lever 40, by engagement with the solid part of shaft 20A, to be moved to the left as shown in FIG. 4 to contact end face 43 and thereby limit the angular position of lever 37.

The face 39 is part of a fixed cam face (the shape of which is shown in more detail in FIGURE 2,) which serves only to provide a stop for the movement of lever 37, it having no other function in the mechanism. Assuming that there are a number of records on the stack, lever 37 will be returned in the direction of arrow 44 to its original position, at the end of the changing cycle by the return movement of cam plate 10, the lever 37 still being controlled angularly by contact of the lever 40 with face 43.

Figure 6:
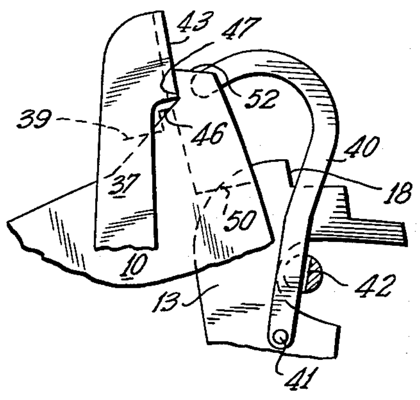
FIGURE 6 is a partial plan view of the mechanism in an intermediate position.

In the first position, in which the face 43 engages face 39, the mechanism can operate and drop records successively without the normal functions of the mechanism being affected. A second position can only be adopted by the lever 37 when the overarm 20 is dropped to its lowermost position due to the last record falling from the stack onto the turntable. As is known, the dropping of the last record occurs part way through the change cycle whereby cam plate 10 has moved in the direction of arrow 15 to permit lever 37 to arrive at the FIG. 4 position. As soon as the last record drops, overarm 20 also drops bringing notch 42 into alignment with overarm lever 41 as shown in FIG. 3. This immediately releases the holding of the overarm lever. The lever 40 then enters the notch 42, being moved by the face 43 under the action of spring 38, so that face 43 then contacts the abutment 46 and the second position is reached. Lever 37 thereby slides into the second position shown in FIG. 5 during the latter portion of the change cycle which effects a dropping of the last record. The face 43 of lever 37 is held in contact with abutment 46 only during the record changing cycle after the release of the record, since return movement of the cam plate 10 in the direction of arrow 16 will act to bring face 43 away from abutment 46. It should be noted that there is a catch face 47 on cam plate 10 which provides a catch to hold the face 43 of lever 37 in an intermediate position, between the second and third positions. Movement to the intermediate position which is shown in FIG. 6 occurs as cam plate 10 returns to the rest position whereby, as face 10B of the cam plate moves arm 37 away from face 39 and abutment 46, spring 38 acting on lever 37 causes the lever to slide along face 10B and into engagement with catch face 47. FIG. 6 shows the rest position of the mechanism while the last record is playing and it will be noted that end face 43 has now been positioned beyond abutment 46 in order that it may clear the abutment on the next cycle. Abutment 46 is provided for the purpose of enabling the last record to be played and provide a delay of one cycle after the overarm 20 is dropped. Without this abutment 46 the mechanism would be switched-off prior to playing the last record.

During the changing cycle in which the last record is dropped, about half-way round the cycle, the second position of the lever 37, i.e. against the abutment 46, is obtained. Towards the end of the cycle however, the lever 37 is gathered by the edge of cam plate 10 and moved outwardly in the direction of arrow 44 and rotationally by the spring 38 in the direction of arrow 49 against catch face 47. At this position the changing cycle ends, and the last record is then played.

Figure 7:
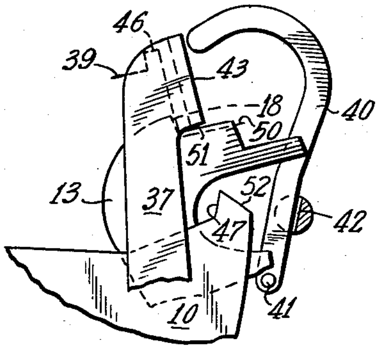
FIGURE 7 is a partial plan view of the mechanism in the third position.

Now, during the next changing cycle as cam plate 10 is oscillated in the direction of arrow 15, the face 43 of lever 37 drops past the abutment 46, and the face 43 is allowed to contact and to stop against face 50 which constitutes the third position shown in FIG. 7. At the same time, the edge 51 of face 43 is placed in the path of cam face 18 on lever 13, thus preventing the pick up arm from moving from the rest position. Lever 13 is pivoted to the base plate and supports pickup arm 14. The action of cam face 18 is explained more fully in our co-pending U.S. patent application No. 160,361. Continued movement of cam plate 10 in the direction of arrow 15 allows catch face 47 to leave face 43 on lever 37 and this allows lever 37 to swing into the fourth position due to action of spring 38.

Figure 8:
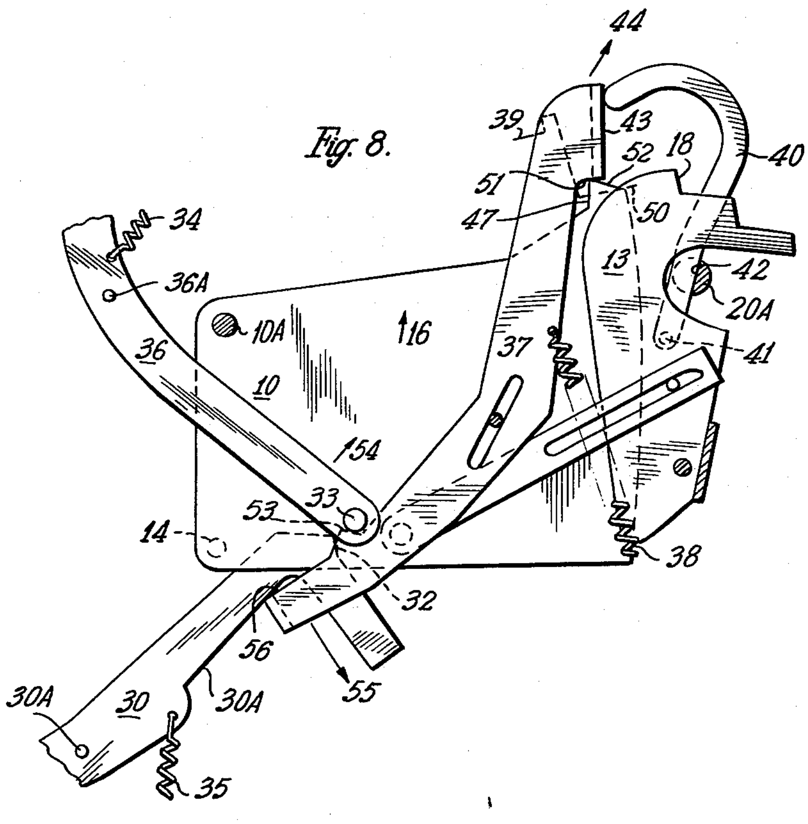
FIGURE 8 is a partial plan view of the mechanism approaching the "off" position from the fourth position.

The reverse movement of cam plate 10 in the direction of arrow 16 results in engagement of the top of detent 52 with the edge 51 of lever 37. The fourth position at the commencement of the reverse movement of cam plate 10 is shown in FIG. 8. The movement of plate 10 at 52 gives extra movement of lever 37 in the direction of arrow 44. It must be noticed that the difference between the third and the fourth positions is that in the third position the face 43 is capable of being retained by the catch face 47 whereas in the fourth position the edge face 51 contacts face 52 and gives the further movement by the depth of the catch face 47. In the movement from the third to the fourth position the pin 33 is engaged by catch face 53. Now, when the lever 37 is moved in the direction of arrow 44 by the excess amount due to the engagement of face 52, with 51, catch face 53 pulls the pin 33 in the direction of arrow 54 which allows the detent 32 to pass the pin 33 so that the control lever 30 returns to its off position by means of spring 35, and the switch switches off by lever 36 moving under the influence of spring 34.

When the control lever 30 is moved by spring 35 after the detent 32 is released by pin 33, the face 30*a* moves rapidly towards face 56 and on contacting it moves the lever 37 angularly in the direction of arrow 55 which resets the positions of 37 to the normal start position, this being the first position.

It will be seen thalt the control member 37 is mounted for longitudinal and angular movement between four angular positions and four linear positions. Four different combinations of these positions are arranged to control the record changer mechanism in the following ways:

(a) Allowing the mechanism to operate manually, i.e. without revolution of the cam. (Control member 37 in 1st position, FIG. 4.)

(b) Allowing the mechanism to cycle correctly for each record to be played. (Control member 37 in the 1st position, FIG. 4.)

(c) Allowing the last record dropped on to the turntable to be played without switching off. (Control member 37 in the 2nd position, FIGS. 5 and 6.)

(d) Switching the motor off after the last record has been played and leaving the pick up arm on the rest in the switched-off position. (Control member 37 in the 3rd and 4th positions, FIGS. 7 and 8.)

(e) Then re-setting the control member in such a position that a further record changer cycle can be started. (Control member 37 returned to the first position, FIG. 8.)

In this way a control device in the form of a single member 37 provides a mechanical linkage between a control lever 30, a switch lever 36 and an overarm transfer lever 40, the same operating member 10, as is used for the record size selector, being used to control linear movement of this single member 37.

Various modifications may be made within the scope of the present invention.

We claim:

1. In a record changer of the type described, a combination comprising a base plate, record change cycling means mounted on said base plate, an overarm including an overarm shaft slideably and pivotally mounting said overarm to said base plate, a control lever pivoted to said base plate and pivotal between an "on" position and an "off" position, means connected between said base plate and said control lever for biasing said control lever toward the "off" position, a switch operating lever pivoted to said base plate and pivotable between an "on" position and an "off" position, means connected between said base plate and said switch operating lever for biasing said switch operating lever toward the "off" position, latch means cooperating between respective ends of said control lever and said switch operating lever for releasably latching each of said levers in the "on" position, an operating element pivoted to said base plate, follower means connected between said operating element and said record change cycling means for effecting arcuate oscillation of said operating element during a change cycle, a control member, means pivotally and slideably mounting said control member, intermediate its ends to said base plate, said control member having a first end proximate to said control lever and adapted to be selectively engaged and shifted thereby on movement of said control lever to its "off" position, said first end of said control member also being provided with a catch face proximate to said latch means and engageable with an end of said switch operating lever for selectively releasing said latch means, an overarm lever pivoted to said base plate and having a portion thereof proximate to said overarm shaft, said overarm shaft having a lowered position and a plurality of raised positions, said overarm lever being held in a preselected first position by contact with said overarm shaft in any of the raised positions thereof, means on said overarm shaft for cooperating with said overarm lever for permitting arcuate movement thereof to a second position when said overarm shaft is in said lowered position, said control member having a second end proximate to said overarm lever, abutment means on said base plate proximate to said second end of said control member, said second end adapted to selectively engage said abutment means for selectively controlling the position of said control member during a record change cycle, means connected between said base plate and said control member for biasing said second end of said control member toward said abutment means, and a cam face on said operating element and adapted for engagement with said second end of said control member for effecting movement of said control member away from said abutment means during a terminal portion of a record change cycle.

2. In a record changer, the improvement claimed in claim 1, in which said levers, said control member, and said opearting element are pivotally mounted for movement in parallel planes.

3. In a record changer, the improvement claimed in claim 1, and further including a pickup arm pivoted to said frame and means connected to said pickup arm and selectively engageable with said second end of said control member, to maintain said pickup arm in a rest position and prevent movement thereof inwardly to its start position.

4. In a record changer, the improvement claimed in claim 1, wherein said abutment means includes a pair of fixed surfaces disposed in the path of movement of said control member in one linear direction, one of said fixed surfaces engaging said control member in a first position and limiting movement thereof in said one linear direction to a first fixed amount, and the other of said fixed surfaces being engageable with said control member in a second position and limiting movement of said control member in said one linear direction to a second fixed amount greater than said first fixed amount; and further including means between said fixed surfaces restraining further angular movement of said control member comprising an abutment extending from said first fixed surface in the opposite direction of linear movement of said control member, and at the end of said first fixed surface adjacent the beginning of said second fixed surface.

5. In a record changer, the improvement claimed in claim 1, in which said control member is in the form of a relatively flat elongated lever having said second end extending substantially normal to its plane of movement to form an arm cooperable with said overarm lever and said operating element.

References Cited by the Examiner

UNITED STATES PATENTS

| | | | |
|---|---|---|---|
| 2,595,125 | 4/1952 | Carson | 274—10 |
| 2,645,496 | 7/1953 | Baxter | 274—10 |
| 2,657,060 | 10/1953 | Lapish | 274—10 |
| 2,681,227 | 6/1954 | Fisher | 274—1.11 |

LOUIS J. CAPOZI, *Primary Examiner.*

ALDRICH F. MEDBERG, *Examiner.*

A. S. ALPERT, *Assistant Examiner.*